United States Patent

Schmid

Patent Number: 5,230,265
Date of Patent: Jul. 27, 1993

[54] METHOD FOR MACHINE-CUT WORKING OF WORKPIECES WITH ROTATIONALLY SYMMETRICAL SURFACES, PARTICULARLY OF CRANKSHAFTS AND APPARATUS FOR CARRYING-OUT SUCH A METHOD

[75] Inventor: Karlheinz Schmid, Nürtingen, Fed. Rep. of Germany

[73] Assignee: Gebr. Heller Maschinenfabrik, Gesellschaft mit Beschränkter Haftung, Nürtingen, Fed. Rep. of Germany

[21] Appl. No.: 916,199

[22] Filed: Jul. 17, 1992

[30] Foreign Application Priority Data

Jul. 18, 1991 [DE] Fed. Rep. of Germany ....... 4123859

[51] Int. Cl.⁵ .......................... B23B 5/22; B23B 3/30
[52] U.S. Cl. ........................................ 82/106; 82/165
[58] Field of Search ............... 82/1.11, 106, 117, 129, 82/151, 165, 166, 170, 903

[56] References Cited

U.S. PATENT DOCUMENTS

| | | | |
|---|---|---|---|
| 2,494,569 | 1/1950 | McMaster | 82/106 |
| 3,783,718 | 1/1974 | Kuhne et al. | 82/142 |
| 3,793,687 | 2/1974 | Berbalk | 82/106 |
| 4,215,605 | 8/1980 | Toth et al. | 82/165 |
| 4,677,885 | 7/1987 | Schmid et al. | 82/165 |
| 4,852,437 | 8/1989 | DeBruyne | 82/165 |
| 4,899,627 | 2/1990 | Schmidt | 82/117 |
| 5,025,689 | 6/1991 | Mayer | 82/106 |

FOREIGN PATENT DOCUMENTS 1232435 1/1967 Fed. Rep. of Germany ........ 82/903

*Primary Examiner*—William E. Terrell
*Attorney, Agent, or Firm*—Albert H. Reuther

[57] ABSTRACT

During machining of workpieces, particularly crankshafts, in a central region of the workpiece, both tips at opposite unmachined ends are axially retracted from the workpiece; both machined ends of the workpiece are clamped centered with the radial clamping members. During the machining of one workpiece end, the workpiece is clamped equalized at the oppositely located end and during the machining of the central region is clamped centered at this end. A workpiece after end machining and before machining of the central region is relieved for elimination of existing axial tensile-strength pressure stresses. Before the machining of the central region there is applied an axial tensile-strength stress upon the workpiece. Apparatus for carrying-out the method includes two oppositely located main spindles and chucks, which have radially and axially adjustable clamping elements and having two oppositely located centering tips, which are adjustable axially relative to the clamping elements respectively the chucks. One chuck has centering-clamping clamp elements and equalizing-clamping clamp elements which are radially adjustable independently of each other. The centering and the equalizing-clamping clamp elements are adjustable axially in common. One chuck is provided with a load-relief device which is provided with a piston-cylinder-unit. The one chuck for axial stress loading of the clamped workpiece is adjustable by engagement of the piston. The one chuck is a clamping-tong chuck arrangement.

12 Claims, 2 Drawing Sheets

METHOD FOR MACHINE-CUT WORKING OF WORKPIECES WITH ROTATIONALLY SYMMETRICAL SURFACES, PARTICULARLY OF CRANKSHAFTS AND APPARATUS FOR CARRYING-OUT SUCH A METHOD

BACKGROUND OF THE INVENTION

1. Field of the Invention

The present invention concerns a method for machine-cut working of workpieces with rotationally symmetrical surfaces, particularly of crankshafts, which are chucked between tips at both ends unmachined at the peripheral circumference, of which at least one is axially adjustably deliverable, whereby for machine working of the two ends of the workpiece the respectively oppositely located end is clamped radially with chuck means, while at the workpiece end to be machined the radial chuck means are axially retracted, of which the one radial chuck means has centering and the other radial chuck means has equalizing compensation clamping chuck elements, whereby after the end machining the median region of the workpiece is machined, while both radial chuck means engage against the workpiece ends.

The apparatus for carrying-out such a method includes two oppositely located main spindles and chucks, which have radially and axially adjustable chuck elements, and with two oppositely located centering tips which are adjustable axially relative to the chuck elements respectively the chucks.

2. Description of the Prior Art

With a known method of German Offenlegungsschrift 38 09 619 there is machine working of the workpiece at both ends sequentially in time. In order to be able to machine an unmachined workpiece end at the peripheral circumference, it is held only with a centering tip, while the oppositely located workpiece end which is likewise unmachined at the peripheral circumference, is clamped by means of jaws of a jaw chuck, which can be moved radially independently of each other. This jaw chuck forms a radial clamping chuck means with equalizing clamping chuck elements. The oppositely located clamping chuck means has radially centering clamping chuck elements, which initially are axially retracted. Thereby the adjoining workpiece end can be machined on the peripheral circumference with a corresponding tool.

Subsequently the oppositely located workpiece end is machined. Additionally hereto the workpiece end previously machined on the peripherally circumferential side is securely held by means of the radially centering clamping chuck means and the centering tip, while now the other still to be machined workpiece end is held only by a centering tip. The equalizing clamping chuck elements are axially retracted. If also this workpiece end is machined at the peripheral circumference, the workpiece is securely held at both ends by means of the clamping chuck means as well as the centering tips. This clamping tension between the tips remains also during the central-median machining of the workpiece. Since with this central-median machining both the clamping chuck means as well as also the centering tips engage against the workpiece at the previously machined workpiece ends, there exists at both workpiece ends a conformity determination. If the axes of the tips as well as of the centering clamping chuck elements do not coincide exactly, then constraining pressure forces occur which encumber and burden the centering tips. Consequently very strong load burdening of the apparatus and of the workpiece occur and are encountered. The apparatus is subjected to a strong wear, while the workpiece ends because of these load burdens have too great rotational tolerances.

Equalizing clamping chuck elements, which clamp equalizingly to the workpiece center, represent a compromise, since the rotational accuracies at the clamping diameter are comparatively small and nominal.

SUMMARY OF THE INVENTION

An object of the present invention basically is to embody and construct the generic method and the generic apparatus in such a manner that during the complete machining of the workpiece in a single clamping arrangement inadmissable high load burdens of the apparatus and of the workpiece are avoided, without the same having any disadvantageous effect upon the high machining accuracy (rotational accuracy).

This object is fulfilled inventively with the generic method such that with the machining of the still unmachined second end of the workpiece, the tip at the oppositely located already machined first end is retracted axially from this workpiece end, and that during the machining of the middle region of the workpiece both tips are retracted axially from the workpiece and both machined ends of the workpiece are clamped centered with the radial clamping chuck means. This object is fulfilled inventively with the generic apparatus in that the one chuck has centering clamping chuck elements and equalizing clamping chuck elements, which are radially adjustable independently of each other.

With the inventive method initially in the first machining step the one unmachined workpiece end is held with equalizing clamping chuck elements and the other workpiece end is machined. In the next machining step, now this machined workpiece end is clamped centered and the pertaining tip belonging therewith is axially retracted, while the equalizing clamping chuck elements are retracted axially at the oppositely located unmachined workpiece end. Now this workpiece end is machined, whereby via the centering clamping chuck elements on the oppositely located workpiece end there is assured that the workpiece end is machined exactly upon the required diameter. Since the centering tip is retracted from the workpiece in the region of the centering clamping chuck element means, no constraining pressure forces can occur between this centering tip and the chuck elements. The workpiece and the apparatus are thereby not inadmissibly highly load burdened. For the machining of the middle region of the workpiece, both workpiece ends are clamped centeringly and both centering tips are axially retracted. Thereby an extremely high rotational accuracy of the workpiece can be produced, since the centering tips and the workpiece no longer can be highly load burdened.

With the inventive apparatus, one chuck is provided both with centrally clamping and also with equalizing clamping chuck elements, which can be adjusted radially independently of each other. Consequently it is thereby possible with one in the same chuck first to clamp the workpiece end equalizingly and subsequently centeringly in that the respective particular chuck elements are brought into employment. With the inventive apparatus it is thereby possible to machine the workpieces with high accuracy and without inadmissible high load burdening of the workpiece.

BRIEF DESCRIPTION OF THE DRAWINGS

Further features of the invention as well as additional objects and advantages will be apparent from the following description, reference being made to the drawings that show sample embodiment features as follows.

DETAILED DESCRIPTION

Figure 1:
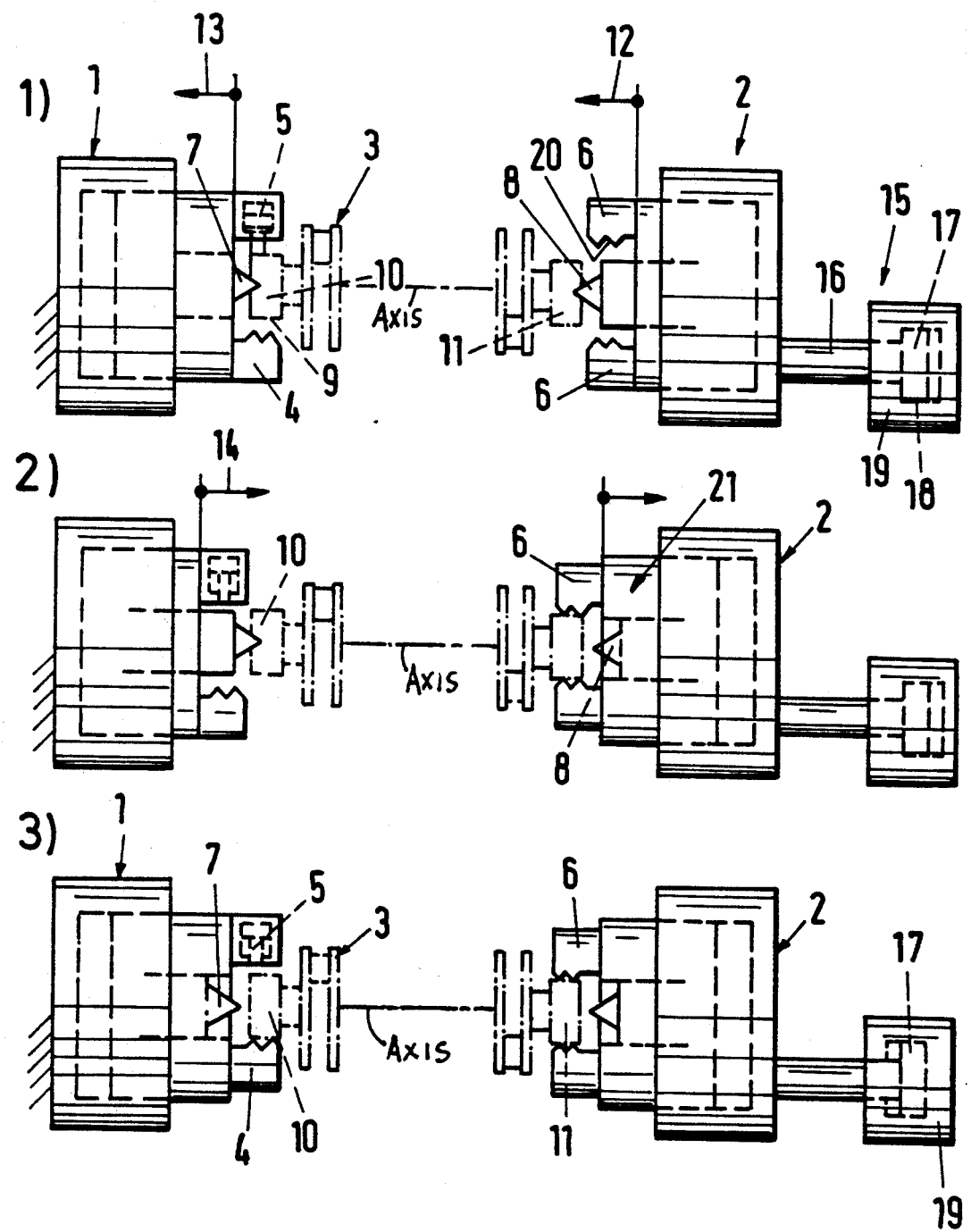
FIG. 1 (1, 2 & 3) is a view that shows in a schematic illustration different working steps during the machining of a crankshaft.

In FIG. 1, schematic illustrations of two chucks 1, 2 are shown for a non-illustrated working machine; with these chucks there is clamped a crankshaft 3 to be machined or another workpiece with rotationally symmetrical surfaces during a part of the machining work.

The chuck 1 has three centering jaws, of which in FIG. 1 only one jaw 4 is shown and illustrated. These centering chuck jaws 4 are arranged over the peripheral circumference of the chuck in equal angular spacing. Additionally the chuck 1 has three equalizing clamping jaws 5, of which in FIG. 1 again only one chuck jaw 5 is shown. Also these equalizing clamping jaws 5 are arranged over the peripheral circumference of the chuck 1 in equal angular spacing. The chuck 1 can have also more than three of the centering and of the equalizing clamping chuck jaws 4 and 5. The chuck jaws 4 and 5 are arranged alternately over the peripheral circumference of the chuck.

The oppositely located chuck 2 has exclusively centering clamping chuck jaws 6.

Both the chuck jaws 4, 5 of the chuck 1 as well as also the chuck jaws 6 of the chuck 2 can be extended and retracted axially.

With the working machine having the two chucks 1, 2, which are provided on a non-illustrated spindle head stock, there can be machined on the crankshaft 3 both ends and all main bearing and flank side surfaces as well as suitably as desired all cheek-side outer diameters in one clamping arrangement.

In FIG. 1 there are illustrated the different positions 1), 2), and 3), of the chuck means 1, 2 respectively the clamping jaws thereof during the crankshaft machining. The crankshaft 3 is first clamped centered between the tips 7 and 8 respectively. The clamping jaws 6 of the chuck 2 are retracted, while the three clamping jaws 5 engage equalizing independently of each other against unmachined outer diameter 9 of one crankshaft end 10. The oppositely located crankshaft end 11 lies free, because the clamping jaws 6 are axially retracted. With that in the position 1) of FIG. 1 the right crankshaft end 11 can be machined, and in the sample embodiment can be turned.

After termination of this machining step, the clamping jaws 6 of the chuck 2 are advanced axially in arrow direction 12 and the crankshaft 3 is clamped in position 2) at the machined right crankshaft end 11. Subsequently the centering tip 8 is retracted axially, so that this centering tip 8 no longer engages at the face of the crankshaft 3. The clamping jaws 5 are retracted radially from the crankshaft end 10 and subsequently axially in arrow direction 13 on the oppositely located chuck 1.

The unmachined crankshaft end 10 with that lies free according to position 2) in FIG. 1, so that this crankshaft end 10 can be machined with corresponding tools, in the sample embodiment it can be turned. During this machining step accordingly with that the crankshaft 3 is clamped between the centering tip 7 and the centering clamping jaws 6 of the chuck 2 and the crankshaft 3 is rotated during the machining in a known manner with cutting speed. Also during the machining step 1), the crankshaft 3 rotates with cutting speed during the machining of the crankshaft end 11.

As soon as the crankshaft end 10 is machined, the clamping jaws 4, 5 of the chuck 1 are advanced axially in arrow direction 14 and now the centering clamping jaws 4 are radially adjusted. Thereby the crankshaft 3 is clamped centered on the machined end 10 with the clamping jaws 4 of the chuck 1. The other clamping jaws 5 of the chuck 1 remain radially retracted. The centering clamping jaws 6 remain in their clamping position on the oppositely located chuck 2. Accordingly with that the crankshaft 3 is clamped centered with the clamping jaws 4 and 6 of the chuck means 1 and 2 at the two ends 10 and 11 thereof in the position 3). The centering tip 7 is retracted axially.

Now the central region of the crankshaft 3 can be machined between the two ends 10 and 11 in a known manner in the position 3) of FIG. 1.

Since the crankshaft 3 is clamped at its machined ends 10 and 11 centered with the clamping jaws 4 and 6 during the central machining, very high rotational accuracies can be attained, which lie in a range below 1/100 mm.

In the described and illustrated sample embodiment, the clamping jaws 4 to 6 are adjusted axially. It is also possible to adjust axially the entire chuck 1, 2 or the pertaining spindle-headstock. The centering tips 7 and 8 are adjusted respectively axially in relation to the clamping jaws 4 to 6 respectively the chuck and independently thereof.

In order to increase the rotational accuracy of the machined crankshaft 3, the working machine is provided with a discharge-relief device 15, which in the position 3) of FIG. 1 takes care to assure that a bending line existing in the crankshaft 3 is eliminated. The relief device 15 has a piston rod 16 connected with the chuck 2 at one end and a free end of which carries a piston 17 that is shiftable in a cylinder chamber 18 of a cylinder 19. The piston 17 in a left end position thereof in FIG. 1 is found in the positions 1) and 2). During clamping of the crankshaft 3 by means of the clamping jaws 4 to 6, the clamping jaws exert an axially directed push-thrust force upon the crankshaft during clamping of the crankshaft 3 by means of the clamping jaws 4 to 6 as conditioned and required due to construction thereof. This push-thrust force moves to bring about that radial force exerted via the clamping surfaces 20 of the clamping jaws 6 is introduced into the clamping jaws 6 with spacing therefrom during the clamping procedure (arrow 21 in position 2)) of FIG. 1. Because of the lever arm relationship between the respective clamping surface 20 and the force introduction 21, the clamping jaws 6 are engaged not only radially against the crankshaft end 11, but rather load to charge the crankshaft 3 also in axial direction in a direction toward the oppositely located chuck 1. The push-thrust force leads to bending-out of the crankshaft 3, which is neutralized and canceled again by the unloading relief-device 15. As soon as the crankshaft ends 10, 11 are clamped by means of the clamping jaws 4 and 6 in the described manner and the tip 7 is retracted axially, the chuck 2 or the pertaining spindle-headstock is adjusted to the right so far in FIG. 1 via corresponding pressure application of the piston 17 until the bending of the crankshaft 3 is neutralized and canceled. The piston 17 hereby moves to the right in the cylinder 19. The bending of the crankshaft 3 and the blow impact brought about thereby during turning of the crankshaft 3 can be determined very simply during a rotation of the crankshaft 3. From the measured blow impact there can be determined very simply how far the piston 17 and with that the chuck 2 respectively the spindle-headstock must be retracted axially in order to eliminate this bending again. The crankshaft 3 is axially tensile-stress loaded advantageously with the unloading relief device 15, whereby a higher strength rigidity of the crankshaft 3 results, that leads to a still better rotational accuracy after the machining.

As a consequence of the described centering clamping of the crankshaft 3 exclusively with the clamping jaws 4 and 6 at the machined crankshaft ends 10, 11 and the relieving of the crankshaft 3 by retraction of the chuck 2 respectively of the spindle-headstock there can be attained an extremely high rotational accuracy of the crankshaft 3 with the described method.

The clamping jaws 4 and 5 on the chuck 1 are actuated independently of each other so that selectively the equalizingly-clamping jaws 5 or the centeringly-clamping jaws 4 grasp and engage the crankshaft end 10.

Figure 2:
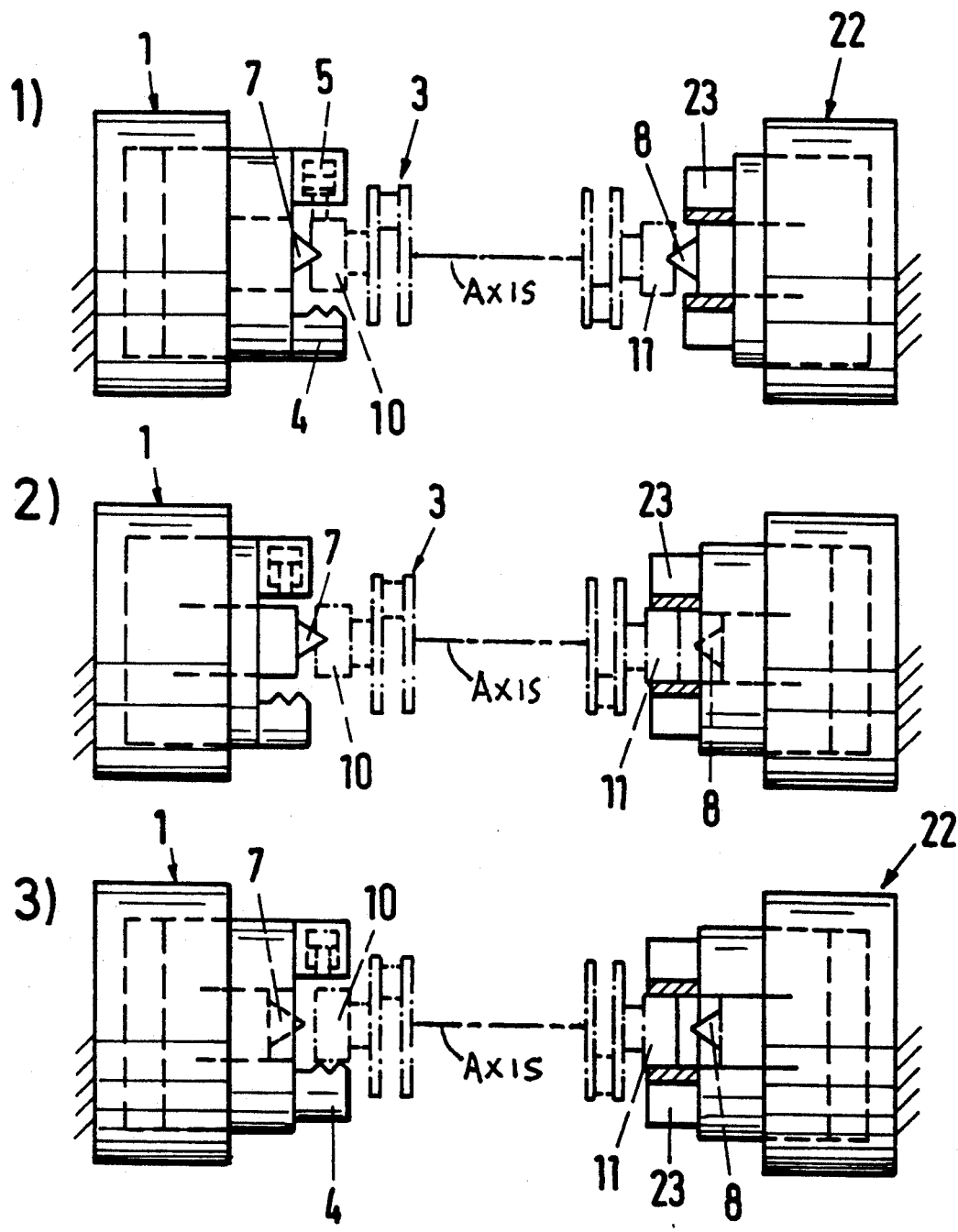
FIG. 2 (1, 2 & 3) is a view that shows an illustration corresponding to FIG. 1 as to different method steps during the machining of a crankshaft according to a second embodiment.

The unloading stress-relief device 15 is not necessary with the embodiment according to FIG. 2, because as a clamping device not a chuck with jaws but rather a clamping-tong chuck arrangement 22 is employed in place of the chuck 2. This tong-pincer chuck arrangement 22 has clamping tongs 23 with which the crankshaft end 11 is clamped centered. As a differentiation distinguishable with respect to a jaw chuck, the clamping-tong chuck arrangement has an advantage that is produces and generates no axial forces during clamping, but rather generating exclusively radially effective forces. Consequently the crankshaft 3 is not axially load stressed via the clamping-tong chuck arrangement 22 and consequently also does not bend out and deflect.

With the sample embodiment the crankshaft 3 is machined in the same manner as with the sample embodiment according to FIG. 1. In the position 1) of FIG. 2, the crankshaft 3 to be machined is initially clamped centered between the tips 7 and 8. The equalizing-clamping clamping jaws 5 of the chuck 1 engage against the unmachined mantle surface of the crankshaft end 10 equalizingly independently of each other, while the centering-clamping clamping jaws 4 have spacing from the crankshaft end 10. The clamping tongs 23 are axially retracted on the oppositely located side, so that the mantle surface of the crankshaft end 11 lies free for the machining via corresponding tools. This crankshaft end 11 is advantageously turned. Hereby the crankshaft 3 rotates with cutting speed about its respective axis in a known manner.

Subsequently the clamping tongs 23 of the clamping-tong chuck arrangement 22 are advanced axially and the machined crankshaft end 11 is clamped centered. The tip 8 is retracted axially. The clamping jaws 5 of the oppositely located chuck 1 are lifted radially from the crankshaft end 10 as with the preceding sample embodiment and are axially retracted, so that the crankshaft end 10 lies free and can be machined with corresponding machining tools, preferably turning tools. During this machining procedure represented in position 2) in FIG. 2, the crankshaft 3 accordingly is held at one end with the centering clamping tongs 23 and at the oppositely located end being held only with the tip 7.

When the crankshaft end 10 is machined, the clamping jaws of the chuck 1 are moved out axially again and now the centering clamping jaws 4 are brought into engagement against the mantle surface of the machined crankshaft end 10. The clamping tongs 23 remain in the stressed clamping position at the oppositely located crankshaft end 11 and the tip 8 remains in the axially retracted position thereof according to position 3) in FIG. 2. The centering tip 7 advantageously is retracted axially so that in this position 3) the crankshaft 3 is clamped centered at both ends by the centering clamping jaws 4 of the chuck 1 and the clamping tongs 23 of the clamping-tong chuck arrangement 22 at the ends 10, 11 of the crankshaft 3, while the tips 7, 8 are retracted axially from the crankshaft 3.

Now the central region of the crankshaft 3 can be machined for example by turning removal, but also via a turning procedure in the position 3) of the clamping tongs 23.

Since the clamping tongs 23 of the clamping-tong chuck arrangement 22 exert no axial forces upon the crankshaft 3, the crankshaft 3 is not bent via the clamping tongs 23 in the clamped condition of the crankshaft 3. By employment of the clamping-tong-chuck arrangement 22 there results an extremely high rotational accuracy of the crankshaft 3, which is still better than the rotational accuracy attained with employment of the clamping jaw chuck 2 according to FIG. 1.

In conclusion, the method for machining of workpieces having rotationally symmetrical surfaces, preferably of crankshafts provides that during the machining of the still unmachined second end 10, 11 of the workpiece crankshaft 3, the tip 7, 8 at the oppositely located already machined first end 11, 10 is retracted axially from this workpiece end, and that during the machining of the central region of the workpiece 3 both tips 7, 8 are retracted axially from the workpiece 3 and both machined ends 10, 11 of the workpiece 3 are clamped centered with radial clamping means 4, 6.

Also during the machining of one workpiece end 11, the workpiece 3 is clamped equalized at the oppositely located end 10 and is clamped centered at this end 10 during the machining of the central region.

The workpiece 3 after the end machining and before the machining of the central region is clamped for elimination of existing axial pressure stresses. An axial tensile-stressing is applied to the workpiece 3 before the machining of the central region.

Apparatus for carrying out the method includes a chuck 1 having centering-clamping clamp elements 4 and equalizing-clamping clamp elements 5, which are radially adjustable independently of each other.

The equalizing and the centering-clamping clamp elements 4, 5 are arranged alternately. The centering and the equalizing-clamping clamp elements 4, 5 are adjustable axially in common together.

One chuck 2 with clamping elements 6 located in clamping position is axially adjustable for unloading relief of the workpiece 3.

One chuck 2 is provided with a load-relieving device 15 which is provided with a piston-cylinder unit including parts 16, 17 and 19.

One chuck 2 for axial tension stress loading of the clamped workpiece 3 is adjustable by impingement engagement of the piston 17.

One chuck 2 is a three-jaw chuck.

One chuck 22 is a clamping-tong chuck arrangement.

The present invention is, of course, in no way restricted to the specific disclosure of the specification and drawings, but also encompasses any modifications within the scope of the appended claims.

What I claim is:

1. In a method for chip-shaving machining of workpieces, particularly of crankshafts, subject to clamping the workpiece radially thereof between tips axially at opposite ends thereof as to unmachined circumferential periphery, axially advancing at least one of said tips and, for machining of the two ends of the workpiece, clamping the respectively oppositely located end of the workpiece radially thereof with radial clamping means, while at the workpiece end to be machined retracting the radial clamping means axially of the workpiece, one of the radial clamping means having centering radial-force clamp-elements and the other radial clamping means having equalizing-force clamp-elements, after end machining then machining the central region of the workpiece while engaging both radial clamping means against the workpiece ends, steps comprising:

during the machining of the still unmachined second end of the workpiece, retracting the tip at the oppositely located already machined first end axially from this workpiece end, and during the machining of the central region of the workpiece, retracting both tips axially from the workpiece and clamping both machined ends of the workpiece centered with radial clamping means.

2. A method according to claim 1, which during the machining of one workpiece end, includes clamping the workpiece equalized at the oppositely located end and during the machining of the central region clamping the workpiece centered at this end.

3. A method according to claim 2, which after the end machining and before the machining of the central region includes clamping the workpiece for elimination of existing axial pressure stresses.

4. A method according to claim 3, which before machining of the central region includes applying of an axial tensile-stressing force upon the workpiece.

5. In an apparatus for performing machining of workpieces with rotationally symmetrical surfaces, particularly of crankshafts which are held positioned by chuck means located axially spaced from each other as to workpieces between tips at opposite ends having unmachined peripheral circumference thereof with at least one of said tips being axially forwardable, and for machining of the two ends of the workpiece the respectively oppositely located end is positioned clamped radially with two main spindles and said chuck means located opposite to each other, which have clamping elements adjustable radially and axially, and with two centering tips located opposite to each other, which are adjustable axially relative to the clamping elements respectively the chuck means, the improvement therewith comprising:

at least one of said chuck means respectively having centering-clamping-force clamp elements and having equalizing-clamping-force clamp elements, which are radially adjustable independently of each other.

6. An apparatus according to claim 5, in which said equalizing-clamping-force clamp elements and centering-clamping-force clamp elements are arranged alternately as to each other.

7. An apparatus according to claim 5, in which said centering-clamping-force clamp elements and the equalizing-clamping-force clamp elements are axially adjustable in common.

8. An apparatus according to claim 5, in which one of said chuck means is adjustable axially for relieving load stress of the workpiece when the clamp elements are located in clamping position.

9. An apparatus according to claim 8, in which one of said chuck means is provided with a load stress relief device that is provided with a piston-cylinder unit.

10. An apparatus according to claim 9, in which one of said chuck means is adjustable for axial tensile-stress loading of the clamped workpiece by engagement of the piston.

11. An apparatus according to claim 8, in which one of said chuck means is a three-jaw chuck.

12. An apparatus according to claim 8, in which one of said chuck means is a clamping-tong chuck arrangement.

* * * * *